2,961,364
Patented Nov. 22, 1960

2,961,364

METHOD OF MAKING BONDED FIBROUS PRODUCTS

Arthur Laslett Smith, Huntingdon Valley, and William R. Conn, Perkasie, Pa., assignors to Rohm & Haas Company, Philadelphia, Pa., a corporation of Delaware No Drawing. Filed Dec. 9, 1954, Ser. No. 474,264

9 Claims. (Cl. 154—128)

This invention relates to bonded fibrous or filamentous products having a laminated fabric structure or comprising fibrous mats in which the fibers or filaments are distributed haphazardly or in random array. The invention also relates to methods for producing the bonded fibrous products or molded articles therefrom. The bonded fibrous products are not only useful in the production of molded articles of either flat or three dimensional shape, but also as insulating material and the like as will be described more particularly hereinafter.

The bonded fibrous products of the invention comprise a binder of an essentially linear copolymer cross-linked to an insoluble condition with polyvalent metal ions. The versatility of the binder used in the present invention is such as to be readily adapted to various methods of production of the fibrous products. The class of binder of the present invention include types which can be insolubilized or cured by mere drying at room temperature or at temperatures therebelow. They also include specific types which require elevated temperatures for the fusion thereof to effect bonding and these types have certain advantages which will be pointed out more particularly hereinbelow. In either case, the bonding of the fibers is effected with a clear, substantially colorless binder which has good adhesion to all sorts of fibers and filaments and even to those of siliceous character which, in the past, have been difficult to handle because of the difficulty of finding colorless binder materials which are adequately adhesive toward the siliceous material such as glass. The binders of the present invention are also substantially free of discoloration when subjected to elevated temperatures, such as those used for drying or fusing. The cured or insolubilized binders are unaffected by water or organic solvents, such as styrene, even at molding temperatures, whereby the bonded fibrous products are adapted to be used as molding preforms or molding inserts for the production of molded articles from various thermosetting resins as will be pointed out in more detail hereinafter. The binders are also free of cold flow and are resistant to flow at elevated temperatures, whereby shifting of the fibers or filaments in the bonded products is substantially completely prevented even at elevated temperatures during subsequent molding with such products being used as reinforcing inserts or preforms. Other objects and advantages of the invention will be apparent from the description thereof hereinafter.

In accordance with the invention, a fibrous product is treated with an aqueous dispersion of a polyvalent metal compound, yielding polyvalent metal ions, and of a water-insoluble linear copolymer of monoethylenically unsaturated monomeric units comprising 0.5 to 7 mole percent of units containing carboxyl (—COOH) groups. The polyvalent metal compound may be an oxide, hydroxide or salt as pointed out more particularly hereinafter and should be present in an amount equivalent at least to that needed to cross link by neutralization sufficient carboxyl-containing units of the copolymer to provide at least 0.5 mole percent of cross-linked units in the copolymer. Preferably, the dispersion contains sufficient polyvalent metal ions to cross-link all of the carboxyl units in the polymer, and if desired an excess of the polyvalent metal ions may be present. A non-ionic emulsifier is also present in the dispersion.

When the fibers are present in the form of a so-called "non-woven" mat in which they are haphazardly distributed, the mat may be formed by carding when the fibers are of such a character, by virtue of length and flexibility, as to be amenable to the carding operation. Natural fibers like jute, sisal, ramie, hemp, wool and cotton may be used, as well as many artificial fibers or filaments including rayon, those of cellulose esters such as cellulose acetate, proteinaceous fibers such as those of casein, vinyl resin fibers such as those of polyvinyl chloride, copolymers of vinyl chloride with vinyl acetate, vinylidene chloride or acrylonitrile containing a major proportion of vinyl chloride in the polymer molecule, polyacrylonitrile and copolymers of acrylonitrile with vinyl chloride, vinyl acetate, methacrylonitrile, vinyl pyridine, or mixtures of such comonomers and containing a major proportion from 75% to 95% of acrylonitrile in the copolymer molecule; also condensation polymers such as polyamides of nylon type, polyesters such as ethylene glycolterephthalate polymers and the like. The thin web or fleece obtained from a single card may be treated in accordance with the present invention, but generally it is necessary and desirable to superpose a plurality of such webs to build up the mat to sufficient thickness for the end use intended particularly in the making of heat insulation. In building up such a mat, alternate layers of carded webs may be disposed with their fiber orientation directions disposed at 60° or 90° angles with respect to intervening layers.

Mats may also be formed by the deposition of fibers, either natural or artificial, from an air stream. Thus, continuous filaments may be fed to a cutter or breaker which discharges the fibers into the discharge side of a blower. Suitable conduits are provided to guide the fibers to a collecting screen or air-pervious structure for collecting the fibers in the form desired. The screen may be in the form of an endless traveling belt passing through the lower portion of a tower into the upper portion of which the blown fibers are introduced by the conduit work. A suction box may be disposed beneath the upper course of the traveling screen to assist in the deposition of the fibers thereon. Instead of having a traveling flat screen, a stationary formed screen may be used. For example, it may take the form of a hat-shaped cone as in the felt hat-making industry. Alternatively, it may have any other form suitable to produce the desired shape of the fibrous product, such as a rectangular tray. Again, suction may be applied beneath the screen to assist deposition of the fibers thereon.

The fibers and filaments may be formed by direct spraying from a solution or molten mass thereof. This is a conventional procedure for the formation of glass fibers or mineral wool fibers as well as those of nylon or of thermoplastic materials, such as vinyl resins of the type mentioned hereinabove adapted to be dissolved in a suitable solvent, such as acetone or dimethylformamide, or to be melted. The solution or melt is of course directed to suitable nozzles or jet-forming orifices and a high pressure fluid stream, such as of cold or hot air or of inert gases such as nitrogen or even of steam, is directed against the stream or streams of filament-forming material to disrupt them and coagulate them as fibers in the vicinity of the orifices. Electrostatic spinning methods may also be employed for this purpose. As in the case of the use of blowers, the disrupted and dispersed fibers may be directed to the top of a settling tower and be allowed to settle, with the aid of suction devices, upon a suitable traveling or stationary screen at the bottom of the tower. This procedure is adaptable to the production of fibers of siliceous materials such as glass or mineral wool as well as to thermoplastic resin fibers mentioned above.

Another procedure may involve the extrusion of continuous filaments, either from solutions of the filament-forming material or from molten masses thereof, and the cutting or breaking of the filaments to fibers of a predetermined length which may be fed to a hopper at the top of a settling tower into which they may be discharged by conventional feeding devices, and at the bottom of which a traveling or stationary screen may be deposited for collection of the fibers.

For certain purposes, the fibers or filaments may be spun into yarns and woven into fabrics which may then be adhered together by the binder of the present invention to prepare preforms adapted to form molded products. Besides the use of bonded mats or fabrics in laminar relation, fabrics may be chopped up or chopped yarns or cords may be bonded together in haphazard relationship to form preforms adapted to be used in the production of molded articles. In all such fibrous products intended for the preparation of molded articles, preferred fibers are those of siliceous character, such as glass or mineral wool types, because of the exceptional strength imparted to the molded products when they are reinforced by such fibrous materials.

The fibers and filaments that may be used in the present invention may be natural or artificial as stated above. The selection of the particular material of which the fiber is made frequently depends upon the use intended of the product. For example, siliceous fibers are extremely valuable in the production of molded articles because of the exceptitonal strength obtained by their use. However, when the bonded fibrous products are used for filtration purposes, fibers of certain resins may be preferred to provide resistance to attack by acids or alkalis that may be present in the liquids to be filtered. Thus, polymers containing a high percentage of acrylonitrile or of vinyl chloride or even of such highly halogenated resins as polytetrafluoroethylene or poly(chlorotrifluoroethylene) may be more useful in such cases. For certain purposes it may be desirable to form the fibrous products from a mixture of fibers of different types. An example is the use of a mixture of thermoplastic fibers of potentially adhesive character with other fibers which lack such potentially adhesive character. A fibrous product comprising such a mixture may be heated to the appropriate temperature to render the potentially adhesive fibers tacky to effect binding of the fibers in the product by this procedure.

The binder of the present invention is applied in the form of an aqueous dispersion which may be produced by the emulsion polymerization of monomers containing carboxylic acid groups with other monoethylenically unsaturated comonomers. Examples of the monoethylenically unsaturated monomers containing carboxyl groups are acrylic acid, methacrylic acid, ethacrylic acid or other α-substituted polymerizable acrylic acid including α-chloro acrylic acid, itaconic acid, citraconic acid, maleic acid, fumaric acid and so on. The preferred acids, because of their ease of polymerization and availability, are the acrylic acid and methacrylic acid. The comonomers that are copolymerized with the acids may be selected to provide various properties in the binder. Thus, they may provide a soft and flexible binder or they may provide a hard and stiff binder which imparts corresponding stiffness to the bonded fibrous product.

Useful comonomers which tend to yield soft and flexible polymers when copolymerized with one of the acids mentioned above are those which yield solid polymers which ave a $T_i$ below 15° to 20° C. The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The polymerizable, neutral, comonomers which form soft, solid polymers in the presence of peroxidic catalysts include any primary and secondary alkyl acrylate, even with alkyl substituents up to eighteen or more carbon atoms, primary or secondary alkyl methacrylates with alkyl substituents of five to eighteen or more carbon atoms, or other monovinylidene compounds as defined above which are polymerizable below 80° C. with free radical catalysts to form soft solid polymers, including vinyl esters of saturated monocarboxylic esters of over two carbon atoms. The preferred monovinylidene compounds are the stated acrylates and methacrylates and of these the most practical esters are those with alkyl groups of not over 12 carbon atoms.

The preferred monomers which by themselves yield soft polymers may be summarized by the formula

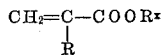

where R is hydrogen or the methyl group and $R^x$ represents, when R is methyl, a primary or secondary alkyl group of 5 to 18 carbon atoms, or, when R is hydrogen, an alkyl group of not over 18 carbon atoms, or better, of two to 12 carbon atoms.

Typical compounds coming within the above definition are methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, etc.

As polymerizable monovinylidene monomers which by themselves form hard polymers, there may be used alkyl methacrylates having alkyl groups of not over four carbon atoms, also tert-amyl methacrylate, tert-butyl or tert-amyl acrylate, cyclohexyl or benzyl acrylate or methacrylate, acrylonitrile, or methacrylonitrile, these constituting a preferred group of the compounds forming hard polymers. Styrene, vinyl chloride, chlorostyrene, vinyl acetate and p-methylstyrene also form hard polymers.

The above monomers yield polymers under the influence of free radical catalysts, particularly peroxidic catalysts, which polymers are generally regarded as hard. These polymers, when free of any appreciable content of monomer, have $T_i$ values above about 20° C. Hard polymers have also been defined as those having softening points above 55° C. or brittle points above about 5° C. These are all different appraisals of the force required to produce a give deformation in a body in a given time and to evaluate the aggregation of various properties encompassed within the term of hardness.

Preferred monomers which by themselves form hard polymers may be summarized by the formula

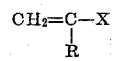

wherein R is hydrogen or the methyl group and wherein X represents one of the groups —CN, phenyl, methylphenyl, and ester-forming groups, —COOR', wherein R' is cyclohexyl or, when R is hydrogen, a tert-alkyl group of four to five carbon atoms, or, when R is methyl, an alkyl group of one to four carbon atoms. Some typical examples of these have already been named. Other specific compounds are methyl methacrylate, ethyl methacrylate, propyl methacrylate, isopropyl methacrylate, butyl methacrylate, sec-butyl methacrylate, and tert-butyl methacrylate.

It is frequently desirable to copolymerize the carboxyl-containing monomer with a mixture of two or more different comonomers, one or more of which are selected from the hard category just mentioned and another of which is selected from the soft category. An example of this would be a copolymer of 8% to 55% ethyl acrylate, 44% to 90% of methyl methacrylate and from about 0.5 to about 6% of methacrylic or acrylic acids.

For certain purposes, the copolymers of the present invention having a $T_i$ of about 30° C. or lower may be preferred. These set on drying at room temperature to bind the fibers with a soft flexible binder bridging the fibers at their points of intersection or intercrossing with a firm grip. The fact that they dry at room temperature to bonded condition eliminates the necessity to provide a special drying or baking at elevated temperatures to effect the bonding. In addition, their flexibility adapts the fibrous product to be readily conformed to shaped contours which may be of value in cases where an insulating product or mat is desired to be bent into the shape of a structure to be covered therewith as in the wrapping of a pipe or cylindrical vessel. Such wrapping can be effected without extensive rupture of the bonds between the fibers and without excessive compacting of the mat, which thereby largely retains its bulky character with numerous small air-spaces and high heat-insulating value. However, for certain purposes, it is preferred to use dispersions of copolymers having a $T_i$ of 35° C. or higher, such as from 35° to 100° C. In order to effect proper bonding of the fibers with the cross-linked polyvalent metal salt obtainable from such a dispersion, it is necessary that the drying be effected at temperatures above the $T_i$ temperature of the particular copolymer. Otherwise the cross-linked copolymer deposits in particulate form in which the particles are of the order of size of the dispersed resin particles in the aqueous dispersion whereby effective bonding is not obtained. By drying the treated fibrous product at temperatures above the $T_i$ value, fusion or coalescence occurs giving rise to substantial masses adequate in size to bind the fibers at their intersections. The peculiar advantage of the use of dispersions of copolymers, having the elevated $T_i$ value of at least of about 35° C., is that in the operation of applying the dispersion to the fibrous mass as by spraying, any excess that is deposited on the walls of the spraying chamber dries at the prevailing room temperature below 35° C. to discrete particles or a powder which is readily removed from the equipment merely by brushing. To take advantage of this property, care is taken to avoid any substantial elevation of the temperature in the application equipment, such as the spraying equipment or chamber, appreciably above room temperature in cases where the $T_i$ value of the copolymer is in the neighborhood of 35° C. Of course, when higher $T_i$ values of 55° to 100° C. characterize the copolymer, considerable elevation of the temperature in the spraying equipment may be present without encountering coalescence in the excess material deposited in the walls of the equipment, provided the temperature surrounding such equipment does not approach too closely (say within 10° C.) the temperature of the $T_i$ value of the particular copolymer involved.

In the preparation of bonded fibrous products of the present invention, which are intended to serve as preforms in the making of molded products, the use of copolymers having higher $T_i$ values also has the advantage that the preform is much stiffer in character and encounters less risk of disturbance of the fibers during the handling of the preform in preparing it for the molding operation per se.

The dispersions adapted to be used as the binder applying medium of the present invention are most advantageously prepared by emulsifying with a non-ionic dispersing agent and copolymerizing, preferably under the influence of a peroxidic free radical catalyst, a mixture of the monomers of which at least 0.5 to 7 mole percent is one of the carboxyl-containing monomers above. After thus copolymerizing the emulsified monomers, at least some of the free carboxyl groups in the copolymer are neutralized by means of said oxides, hydroxides or salts of a polyvalent metal. Less advantageously, water-insoluble copolymers comprising the above proportion of carboxyl-containing monomeric units produced in any other way may be dispersed in water by means of non-ionic dispersing agents and then at least partially neutralized with the appropriate polyvalent metal compound.

The non-ionic emulsifiers or dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

The dispersions can be prepared at temperatures from 0° C. to about 100° C., but intermediate temperatures are much preferred. Thus, with the esters in which the alkyl group contains one to four carbon atoms a temperature from about 10° C. to about 60° C. is employed whereas a higher temperature; e.g., 30° C. to 80° C., is recommended when those esters containing five to eight carbon atoms in the alkyl group are copolymerized. Peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "persalts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites and the salts—such as the sulfates—of metals which are capable of existing in more than one valence state such as cobalt, iron, nickel, and copper. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way it is possible to prepare dispersions which contain as little as 1% and as much as 60% of the resinous copolymer on a weight basis. It is, however, more practical—hence preferred—to produce dispersions which contain about 30% to 50% resin-solids. Generally, the dispersion is diluted to 1% to 20%, and preferably 2% to 10%, resin content at which it is readily adapted to be applied as by spraying.

The neutralization may be done by adding a basic compound of a polyvalent metal which forms salts with the carboxyl groups of the copolymer. Oxides or hydroxides of barium, calcium, magnesium, and strontium have been employed for this purpose and all produced dispersions which deposited films of outstanding properties. Hydroxides of aluminum, lead and zirconium may also be used. It must also be pointed out that the basic salts of polyvalent metals and their salts of weak acids (which are in effect basic compounds when in the aqueous dispersions) have been used successfully, such as the normal and basic acetates of barium, calcium, cadmium, cerium, strontium, zirconium, lead, cobalt (ic and ous), chromium (ic and ous), copper (ic), zinc, magnesium, iron (ous), manganese (ous), mercury (ic), and nickel (ic and ous). Tartrates, citrates, and oxalates may be used, such as stannous tartrate and titanium oxalate. Basic aluminum acetate, basic aluminum formate and basic zirconyl acetate are especially valuable for ionically cross-linking the resins. The presence of a non-ionic emulsifier maintains the stability of the copolymer dispersion even after the addition of the polyvalent metal compound.

The basic metallic compounds which are used to neutralize the carboxyl groups of the copolymers and thus convert them into salt groups are those of divalent and trivalent metals which have at least a solubility in water of 0.0006 gram per 100 cc. Actually, only two valences of the trivalent metals may be involved in the neutralization so that the compounds of trivalent metals may react, as far as this invention is concerned, as if they were compounds of divalent metals.

The highly soluble basic salts have the following advantages over the oxides and hydroxides of relatively low solubility. They are rapid in their cross-linking action. They are easily distributed uniformly through the resin dispersions in controlled amounts. They are easier to handle since they can be dissolved in aqueous solutions and it is unnecessary to grind to a dust as in the case of relatively insoluble material like the oxides and hydroxides. They involve on that account less of a health hazard. The highly soluble basic salts produce binding masses of better transparency and other optical properties. In addition, the basic salts are generally three to five times as efficient in cross-linking as the salts of weak acids. Accordingly, the basic salts are the preferred groups of cross-linking compounds.

The binder dispersion may be applied to the dry fibers after the formation or deposition of the web or mat so as to coat one or both surfaces thereof and to penetrate partially into the interior of the fibrous products. Alternatively, the binder dispersion may be applied to the fibers as they fall through the settling chamber to their point of deposition. This is advantageously obtained by spraying the binder dispersion into the settling chamber at some intermediate point between the top and the bottom thereof. By so spraying the fibers as they descend to the point of collection, it is possible to effect a thorough distribution of the binder among the fibers before they are collected into the product. In the production of certain fibrous products wherein a hot molten mass of a polymer, such as nylon or a fused siliceous mass or glass, is disrupted by jets of heated air or stream, the binder dispersion may be sprayed directly on the fibers while still hot and very shortly before their deposition so that quickly after deposition the binder is set and bonds the fibers in proper relationship. Preferably, however, application of the binder dispersions to the fibrous product is made at room temperature to facilitate cleaning of the apparatus associated with the application of the binder dispersion.

As pointed out above, the binder dispersion may be applied to one or both surfaces of the fibrous product or it may be distributed through the interior as well. In the case of woven fabrics which are to be adhered together as a preform as a preliminary to the forming of a molded article containing a plurality of such fabrics as a reinforcement, the binder dispersion is preferably applied lightly between the layers of fabrics.

The binder of the present invention may be applied in conjunction with other binders. For example, another type of binder, such as glue or resin-forming condensates or urea-formaldehyde, melamine-formaldehyde and the like, may be applied either to the interior or to the external surfaces of the fibrous product while the binder of the present invention is applied to the external surfaces or to the interior of such products. Similarly, the use of potentially adhesive fibers within the fibrous product may also be resorted to in conjunction with the use of a binder of the present invention.

Generally, the proportion of the binder of the present invention to the weight of the fiber component of the fibrous product may vary widely depending on the character of the product desired. For the production of preforms, intended to be converted into molded articles, it is preferred to employ from 1½% to 10% of the binder of the present invention based on the weight of fibers. In the production of insulation masses, the amount of binder employed may fall in the lower part of the range just specified if the binder is applied primarily adjacent to the surface or surfaces of the product or if it is applied in conjunction with other binders.

It is essential that the drying of the treated fibrous product, that is the fibrous product carrying the binder dispersion, be effected at a temperature above the $T_i$ of the binder copolymer in order to effect proper coalescence and bonding of the fibers. As pointed out above, if the $T_i$ of the copolymer is about 30° C. or lower, no special heating is necessary, but it may be advantageous to accelerate the drying and curing of the binder to the set condition. Curing temperatures may be as high as 260° C. for setting the binder, but preferably are in the range from about 110° C. to 200° C.

The binder of the present invention is essentially colorless and has the advantage that it undergoes no discoloration at the elevated temperatures needed for the drying or baking of such products or even for the formation of molded articles with the fibrous products of the present invention used as preforms and ultimately occurring as a reinforcing component in the molded article. The binder of the present invention is resistant to flow at elevated temperatures so a thermoplastic or thermosetting resin can be applied and the composite thereby obtained can be molded at elevated temperature without appreciably disturbing the disposition of fibers in the mass. Similarly, the binder is insoluble in water and organic solvents so that the presence of such materials during subsequent treatment as in molding cannot disturb the disposition of fibers. Consequently there is no "washing" of fibers in the preform with accompanying tendency to form resin-rich areas and fiber-rich areas in the molded article giving rise to such non-uniformity which tends to cause cracking or crazing in the molded articles and resulting weakness in the reinforced structure.

All of these properties render the binder outstandingly valuable in connection with siliceous fibers, such as those of glass or mineral wool, in the production of preforms adapted to be used for forming molded articles. The siliceous fibers are strongly bonded together by means of the binders of the present invention and especially those having a $T_i$ temperature above 35° C. and yet the binder is of such character as not to prevent proper integration of the siliceous fibers within the mass of molding resin. In the molded products, the presence of the binder has no adverse effect either on the appearance or the strength of the final articles. While molding resins or resin-forming materials of numerous thermoplastic and thermosetting types may be employed, the use of thermosetting types of polyesters is particularly advantageous. Such a resin-forming material may comprise an unsaturated polyester (such as a polyester of mixed maleic acid and phthalic acid (in a 50—50 molar ratio) with a glycol, such as propylene glycol) dissolved in styrene or other copolymerizable monoethylenically unsaturated monomers having solvent properties for the low condensed polyester. Binders heretofore used in the preforms become discolored during the molding operation and interfere with the penetration of the molding resin, especially when it is of a polyester type, so that the fused resin is poorly bonded to the portions of the fibers coated by the binder which in turn is manifested by a reduced transparency and corresponding lack of continuity and homogeneity. The binder of the present invention is resistant to such discoloration. In addition, it does not interfere with the penetration of the resin-forming material to the fibers of the preform during the molding operation. This provides excellent transparency and a high degree of homogeneity and continuity in the product. Also, the binders of the present invention having the higher $T_1$ values and accompanying higher stiffness assure the maintenance of the distribution of the fibers during the handling of the preform up to the molding operation.

The fibrous products of the present invention are capable of numerous uses. Thus, the fibrous mats bonded with the improved binders of the present invention may serve as heat or sound insulation materials, as filters for air systems or liquid systems, as permeable membranes as in storage batteries or electrolytic condensers, as cushioning or padding materials for upholstering purposes and so forth. As pointed out hereinabove, fibrous mats or fabrics of siliceous fibers are extremely valuable as reinforcements for molded products using the bonded fibrous mat or fabric as a preform with appropriate molding powders or syrups. For example, the bonded mat or the bonded laminar fabric assembly may be introduced into a closed mold system with an appropriate amount of a thermosetting resin powder or liquid, such as of resin-forming condensates of urea-formaldehyde, melamine-formaldehyde, phenol-formaldehyde or polyesters, such as those described in U.S. Patents 2,255,313 and 2,607,756. From 5% to 45% by weight of the molded article may be composed of the reinforcing fiber network when a mat is used as the preform or in the case of a fabric reinforcement, from 5% to 65% by weight of the molded product may consist of the composite of bonded fabric laminations.

Instead of a thermosetting resin-forming material, there may be used thermoplastic types of resins such as the vinyl or acrylic types of resins. For example, polymers and copolymers of vinyl acetate, vinyl chloride, acrylonitrile, styrene, acrylic and methacrylic acid esters; e.g., the methyl, ethyl, propyl or butyl esters thereof, and so on. Advantageously, a polymer or copolymer may be dissolved in its corresponding monomer or mixture of monomers to provide a solution that may readily be introduced into the mold.

The following examples are illustrative of the fibrous products, the molded articles and the methods for making them in accordance with the present invention:

*Example 1*

A binder dispersion is prepared by the emulsion copolymerization of 20% by weight of ethyl acrylate, 75% by weight of methyl methacrylate, and 5% of methacrylic acid in the presence of a non-ionic emulsifier, namely tert-octylphenoxypoly-ethoxyethanol, containing about 10 ethylene oxide units per molecule and using benzoyl peroxide as a catalyst. The resulting dispersion contains a copolymer whose $T_1$ value is far above 35° C. After the addition of 1½ molar equivalents of basic aluminum acetate for each carboxyl group of the copolymer, the dispersion is diluted to 5% copolymer solids. Glass fibers cut to a length of about 2 inches are supplied from a hopper to the top of a settling chamber provided at the bottom with a shaped screen adapted to collect the fibers in the form of a preform adapted to produce a rectangular tray. Adjacent the top of the inverted screen, spraying devices supply the binder dispersion to the fibers as they are deposited. Deposition is assisted by a suction device beneath the inverted shaped screen. When the fibrous mat collected on the screen reaches the desired thickness, such as ½ inch, the supply of fibers is stopped as well as the binder supply. The screen carrying the deposited fibers which carry the wet binder is then transferred to an oven and heated with hot air at about 175° C. to 190° C. for 1½ minutes. As the water is driven off, the binder fuses and sets to the insoluble condition, wherein it bonds fibers of the mass together. From 3% to 5% by weight of the binder is present on the fibrous mat. This mat is introduced into a closed mold having a cavity of the appropriate shape for producing a rectangular tray and there is introduced into the mold an amount equal to 3 times the weight of the bonded fibrous mat of a solution in 30 parts of styrene of 70 parts of a mixed ester of propylene glycol with maleic and phthalic acid (in a 50–50 molar ratio) and containing 1% of benzoyl peroxide. The mass is molded at 115° C. at about 100 lbs./sq. in. pressure. On removal from a mold, all reinforcing fibers were well integrated in the molded article and it had a smooth surface. The fibers in the final product were well distributed and showed no evidence of the disturbance from their initial lay or distribution in the preform.

*Example 2*

A glass yarn fabric having a weight of about ½ pound per square yard was slightly sprayed with the same binder dispersion as that used in Example 1 and assembled into a 9-layer composite. The composit, while still wet with the binder, was transferred to a heated preforming mold having a cavity somewhat less in size than the cavity of the mold in Example 1. In this preforming operation, the binder was set by heating to a temperature of about 130° C. for about 4 minutes. The composite laminar assembly which comprised about 4% by weight of binder was introduced into the cavity of the closed mold system of Example 1 and an amount equal to about ½ the weight of the composite of the polyester-forming composition of Example 1 was added. On closing the mold and molding the contents at 115° C. at 100 lbs./sq. in. pressure, a rectangular tray having a ⅛ inch wall thickness was produced.

*Example 3*

Ten carded webs of cotton fibers having 1½ inch lengths are conveyed on a traveling screen and are sprayed with an aqueous dispersion containing 5% resin solids of a copolymer of 55% of ethyl acrylate, 43% methyl methacrylate and 2% of acrylic acid, having a $T_1$ of about 36° C. and containing sufficient calcium oxide to neutralize the carboxylic acid groups of the copolymer. The traveling screen conveys the sprayed mat between heated embossing rolls at about 200° C. having regularly-spaced nobs or protuberances to press the fibers together at spaced points and to bond them through the entire thickness of the compressed areas to the sprayed surface fibers. The resulting product is an insulating mat comprising about 10% by weight of the bonding resin.

A thin paper sheet, such as kraft paper, may be fed to the screen under the carded webs and optionally another sheet may be fed on top of the carded web at a point following the spraying. Then the passage of the composite through the embossing rolls effects adhesion of the covers to the inside fiber web at the points where the nobs compress them together. The resulting pads or cushions are useful as heat insulation for refrigerators or deep freezers.

Example 4

Glass fibers are sprayed downwardly from fused streams fed through nozzles of a melting tank and distributed haphazardly on a traveling screen which passes continuously through the bottom of the spraying chamber. At a zone in the chamber just above the point of deposition on the screen, a binder dispersion is sprayed on the fibers. In this case, the binder dispersion comprises a copolymer of 55% methyl methacrylate, 40% of ethyl acrylate and 5% methacrylic acid, having a $T_i$ of about 58° C. The binder dispersion contains sufficient basic zirconium acetate to neutralize the carboxyl groups of the copolymer. After leaving the deposition chamber, the deposition chamber, the screen carries the sprayed fiber mat through an oven having a temperature of about 135° C. The resulting fiber mat may be used as an insulation material and contains approximately 7% by weight of a binder on the weight of the glass fibers.

Example 5

Mineral wool fibers are blown from a group of jets supplied with a molten siliceous magma into one end of a chamber having a traveling screen conveyor passing over its bottom wall. A suction box under the upper course of the conveyor assists in the deposition of fibers on the screen as it passes thereover. Sprays are provided to direct, upon the fibers as they descend to the screen and just above the screen, a binder dispersion comprising 9% of a copolymer of 35% of acrylonitrile, 60% of ethyl acrylate, and 5% of itaconic acid having a $T_i$ between 36 and 40° C. This dispersion contains sufficient calcium hydroxide to neutralize the carboxyl groups of the copolymer. The screen carries the sprayed mat through an oven having a temperature of 210° C. through which the travel of the screen takes about 30 seconds. The resulting product is useful as an insulating material for refrigerators and deepfreezers. It is also useful as a filter.

A section of the flat product obtained is set in the cavity of a mold and there is added 250% of its weight of a solution of 20 parts of poly(methyl methacrylate) in 80 parts of monomeric methyl methacrylate. The temperature of molding is 135° C. and a pressure of 50 lbs./sq. in. is employed. The molded product, after cooling in the mold and removal therefrom showed no evidence of any shift of the fibers from their random position of lay in the preform. It had smooth surfaces and excellent appearance, there being no sign of discoloration at the juncture of the fibers with the surrounding molding resins where the binder was originally disposed.

It is to be understood that changes and variations may be made without departing from the spirit and scope of the invention as defined in the appended claims.

We claim:

1. A process comprising depositing fibers in random array to form a fibrous mat, applying to the fibers an aqueous dispersion of polyvalent metal ions and a water-insoluble copolymer of monoethylenically unsaturated monomeric units comprising from 0.5 mole percent up to but not over 7 mole percent of units containing —COOH groups, drying the dispersion on the fibers of the mat at a temperature which is sufficiently high to effect coalescence of the copolymer particles cross-linked by the polyvalent metal distributed substantially uniformly therethrough whereby fibers of the mat are bonded by the coalesced, cross-linked copolymer.

2. A process as defined in claim 1 in which the dispersion is sprayed on the fibers concurrently with their deposition.

3. A process as defined in claim 1 in which the dispersion is sprayed on the fibers concurrently with their deposition at a point before deposition, and the deposition is effected on a traveling foraminous surface.

4. A process as defined in claim 1 in which the dispersion is sprayed on the fibers concurrently with their deposition at a point before deposition, and the deposition is effected on a traveling foraminous surface and the fibrous mat is subjected to a temperature of 110° C. to 260° C. for a period of less than one minute to about 10 minutes.

5. The process of claim 4 in which the fibers are of siliceous material and the copolymer has a $T_i$ of at least 35° C.

6. The process of claim 5 comprising the additional subsequent step of molding the bonded fibrous mat in a thermosetting resin.

7. The process of clam 5 comprising the additional subsequent step of molding the bonded fibrous mat in a copolymer of styrene and a monoethylenically unsaturated polyester.

8. A process comprising spraying a woven fabric comprising yarns of glass fibers with an aqueous dispersion of polyvalent metal ions and a water-insoluble copolymer of monoethylenically unsaturated monomers comprising from 0.5 mole percent up to but not over 7 mole percent of acrylic or methacrylic acid, assembling a plurality of layers of such fabric with a surface carrying a deposit of the aqueous dispersion disposed adjacent each of the adjoining layers of the assembly, drying the assembly at a temperature to effect coalescence of the copolymer particles cross-linked by the polyvalent metal distributed substantially uniformly therethrough and thereby to find the fibers with the coalesced cross-linked polymer, and subsequently molding a thermosetting resin about the bonded fabric assembly as a reinforcement therefor.

9. A process as defined in claim 7 in which the polyvalent metal is aluminum.

References Cited in the file of this patent

UNITED STATES PATENTS

| | | |
|---|---|---|
| 1,976,679 | Fikentscher | Oct. 9, 1934 |
| 2,664,376 | Philipps | Dec. 29, 1953 |
| 2,676,128 | Piccard | Apr. 20, 1954 |
| 2,681,327 | Brown | June 15, 1954 |
| 2,726,230 | Carlson | Dec. 6, 1955 |